US006960853B2

(12) United States Patent
Endo

(10) Patent No.: US 6,960,853 B2
(45) Date of Patent: Nov. 1, 2005

(54) CONTROL APPARATUS FOR VIBRATION TYPE ACTUATOR AND ELECTRONIC APPARATUS USING IT

(75) Inventor: Takayuki Endo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 10/649,967

(22) Filed: Aug. 26, 2003

(65) Prior Publication Data

US 2004/0150357 A1 Aug. 5, 2004

(30) Foreign Application Priority Data

Aug. 26, 2002 (JP) ....................................... 2002-244859

(51) Int. Cl.[7] ........................... H02K 7/06; H02K 7/065
(52) U.S. Cl. ........................................................ 310/80
(58) Field of Search ...................................... 310/20, 80

(56) References Cited

U.S. PATENT DOCUMENTS 3,401,892 A * 9/1968 Meyers ........................ 241/36
RE30,068 E * 8/1979 Meyers ....................... 318/744
5,767,645 A * 6/1998 Park ........................... 318/560

FOREIGN PATENT DOCUMENTS

JP 5-38553 8/1988 ............ H02N/2/00

* cited by examiner

*Primary Examiner*—Darren Schuberg
*Assistant Examiner*—Judson H. Jones
(74) *Attorney, Agent, or Firm*—Morgan & Finnegan, LLP

(57) ABSTRACT

The present invention discloses a control apparatus for a vibration type actuator that can perform the drive of a driven member in a short time. The control apparatus for a vibration type actuator that excites vibration in a vibration body by applying a frequency signal to an electro-mechanical energy converting element and relativity moves the vibration body and a contact body contacting to this vibration body includes a determination unit determining the drive direction of the vibration type actuator, and a frequency setting unit modifying a frequency of the frequency signal according to whether the drive direction of the vibration type actuator determined by the determination unit is the same as or reverse to the last drive direction at the startup of the vibration type actuator.

8 Claims, 10 Drawing Sheets

CONTROL APPARATUS FOR VIBRATION TYPE ACTUATOR AND ELECTRONIC APPARATUS USING IT

BACKGROUND OF THE INVENTION

1. Field of the Invention

The present invention relates to a control apparatus of a vibration type actuator, and in particular, to electronic apparatus such as a camera, observation equipment, and a lens apparatus that uses the vibration type actuator as a driving force.

2. Description of Related Art

In cameras and lens apparatuses, drive mechanisms each driving a lens with making a vibration type motor as a driving force may be adopted. This vibration type motor vibrates a vibration body by bonding an electro-mechanical energy converting element on a metallic elastic body and making it as a vibration body, and applying plural phases of frequency signals, whose phases are mutually different, to the electro-mechanical energy converting element. Then, this vibration type motor gets a driving force by relativity moving the vibration body and a contact body contacting with pressure to this vibration body (elastic body).

A practical system is one that controls the drive speed of a lens by changing a frequency of frequency signals inputted into an electro-mechanical energy converting element when a lens is driven by such a vibration type motor. In this system, since the drive speeds obtained by individual motors may be different, the frequency of frequency signals is often dealt as a relative value.

Then, quicker startup may be performed by storing the frequency of frequency signals at the time when the lens starts off every time the motor drives the lens and applying the frequency signals at the frequency, which is stored, when next starting the motor.

For example, Japanese Patent Publication No. H05 (1993)-038553 discloses the technology of storing a frequency of frequency signals or a frequency within a predetermined range to this frequency at the time when detecting the start of relative drive of a movable body or an object of a vibration type motor, and using this value as an initial value at the next startup of the vibration type motor.

FIG. 8 shows the schematic structure of a focus lens drive system in a conventional lens apparatus.

The diagram shows a controller 210 controlling the operation of a lens drive system, a V-F converter 201 generating a frequency of a frequency signal to control the rotating speed (drive speed) of a vibration type motor 203, a drive circuit 202 that generates the frequency signal, having the frequency set by the V-F converter 201, and drives the vibration type motor 203, an encoder unit 204 to detect a drive amount and the drive speed of the vibration type motor 203, reduction gears 205 that decelerate an output of the vibration type motor 203 and transmits it to a focus lens 206, and an A/M switch 207 for selecting auto focus or manual focus so as to perform focusing.

Here, when the vibration type motor 203 is normally rotated, the focus lens 206 moves in the direction shown by an arrow X1 (direction of the optical axis) in FIG. 8. When reversely rotated, the focus lens 206 moves in the direction shown by an arrow X2 (direction of the optical axis).

FIG. 6 shows the relation between the frequency of frequency signals (drive signals) applied to the vibration type motor 203 and the rotating speed of the motor. In this graph, a range enclosed with a frame having reference numeral (4) is a frequency range of the drive signals used for driving the focus lens 206.

FIG. 7 shows the relation between the frequency of the drive signals and the drive speed of the vibration type motor 203 in a conventional lens drive system. An upper graph in FIG. 7 shows the change of the drive speed of the vibration type motor 203 to the drive time, and a lower graph shows the change of the frequency of the frequency signals, applied to the vibration type motor 203, to the drive time.

In FIG. 7, f1 denotes a starting-off frequency showing a frequency at the time when the vibration type motor 203 started off when being driven last time, that is, a frequency at the time when an output of the encoder 204 was started. In addition, f2 is a starting frequency at the time when being driven this time, and is set at the same frequency as the starting-off frequency f1 at the time when being driven last time, or a frequency that is higher by a predetermined frequency than the starting-off frequency f1. Then, when being driven this time, the vibration type motor 203 is accelerated by decreasing the frequency of the drive signals from the starting frequency f2.

By the way, reduction gears 205 are usually constituted of several steps of gear trains, screws, or the like so as to decelerate the rotating speed of the vibration type motor 203. Hence, when the vibration type motor 203 is driven in the reverse direction to the last driving, it becomes delayed to transmit power to the focus lens 206 by backlash in the reduction gears 205. Depending on the structure of the reduction gears 205, a backlash amount may become 20 to 30 pulses at the maximum by converting it into the output pulse count of the encoder 204.

Therefore, when reversely driving the vibration type motor 203, it is necessary to drive the vibration type motor 203 by the backlash in addition to the drive amount in the normal rotation (the same direction as that in the last driving) driving. Hence, as shown in FIG. 7, there is a problem that drive time in the reverse rotation (shown by a dotted line in this graph) becomes longer than that in the normal rotation (shown by a solid line in this graph) even if the drive amounts of the focus lens 206 are the same.

SUMMARY OF THE INVENTION

The present invention aims to provide a control apparatus for a vibration type actuator and electronic equipment, using it, that make it possible to shorten drive time in reverse driving when a drive output of the vibration type actuator is transmitted to a driven member (lens etc.) through a power transmission mechanism such as reduction gears.

In order to achieve the above-described object, the control apparatus for a vibration type actuator that excites vibration in a vibration body by applying frequency signals to an electro-mechanical energy converting element and relativity moves a vibration body and a contact body contacting to the vibration body includes a determination unit determining the drive direction of the vibration type actuator, and a frequency setting unit modifying a frequency of the frequency signals according to whether the drive direction of the vibration type actuator determined by the determination unit is the same as or reverse to the last drive direction at the startup of the vibration type actuator. Then, the frequency setting unit lowers the frequency of the frequency signals in the case where the drive direction of the vibration type actuator is reverse to that in the last driving than that in the case the drive direction of the vibration type actuator is the same as that in the last driving. Moreover, the control apparatus for a vibration type actuator further includes a sensor detecting the drive of the vibration type actuator, and a memory unit storing a frequency of the frequency signals at the time when it is detected by the sensor that the vibration type actuator starts. Then, the frequency setting unit sets a frequency of the frequency signals on the basis of the frequency stored in the memory unit.

The features of the control apparatus for the vibration type actuator and electronic apparatus using it according to the present invention will become clear by the explanation of the following specific embodiments with referring to drawings.

DETAILED DESCRIPTION OF THE PREFERRED EMBODIMENTS

Hereinafter, preferred embodiments of the invention will be described in detail with reference to the drawings.

Embodiment 1

Figure 1:
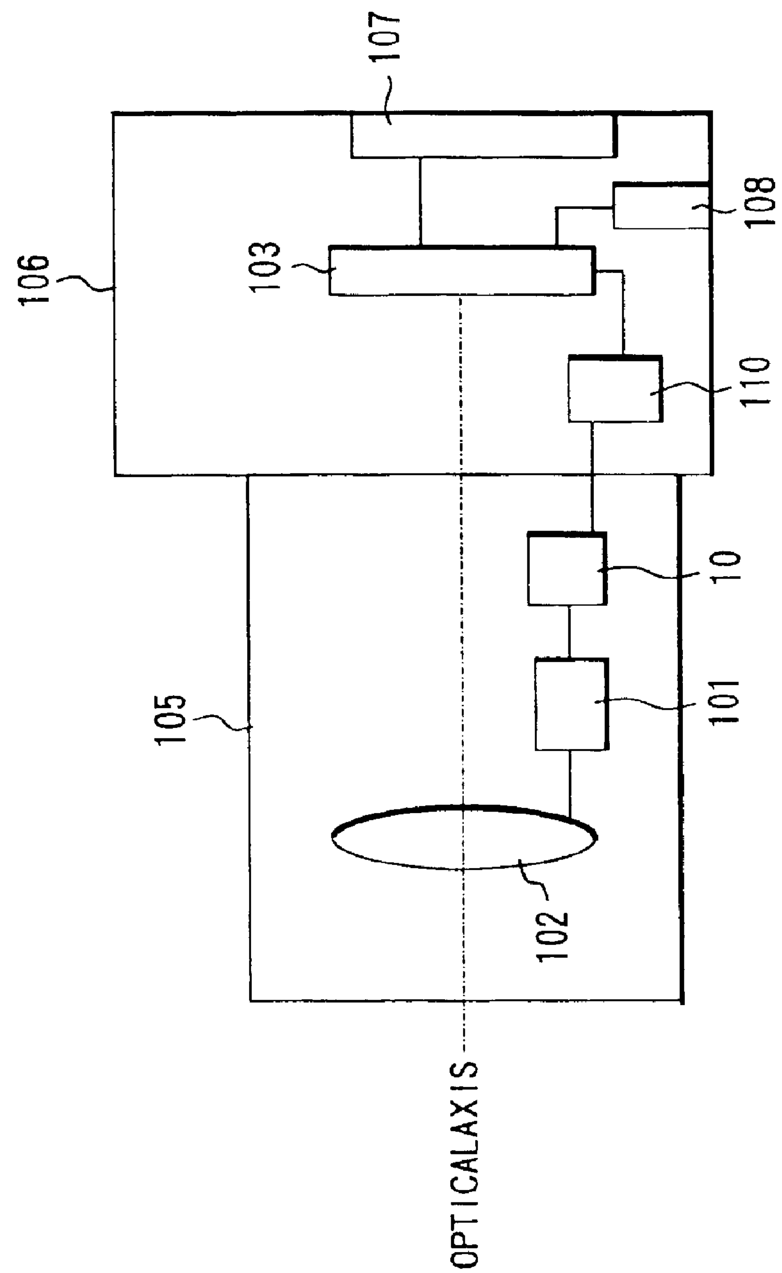
FIG. 1 is a block diagram showing the schematic structure of a camera system that is Embodiment 1 of the present invention.

FIG. 1 shows the schematic structure of a camera system that is Embodiment 1 of the present invention. This camera system comprises a digital camera 106 having an image pickup device 103 such as a CCD or a CMOS sensor, and a lens apparatus 105 (optical apparatus) that is detachable from this camera 106. In addition, it is also good to constitute a camera system by using a film camera for taking a picture on a light-sensitive film in place of the image pickup device 103.

In the diagram, reference numeral 101 denotes a focus lens drive unit whose driving force is a vibration type motor, and reference numeral 102 denotes a focus lens (driven member) constituting an image pickup optical system.

An optical image formed by an image pickup optical system is photoelectrically converted by the image pickup device 103 and is given predetermined signal processing. Thereafter, the image is displayed as a shot picture in a display unit 107 provided in the camera 106, and/or is recorded in a recording medium 108 that is detachable from the camera 106.

Figure 2:
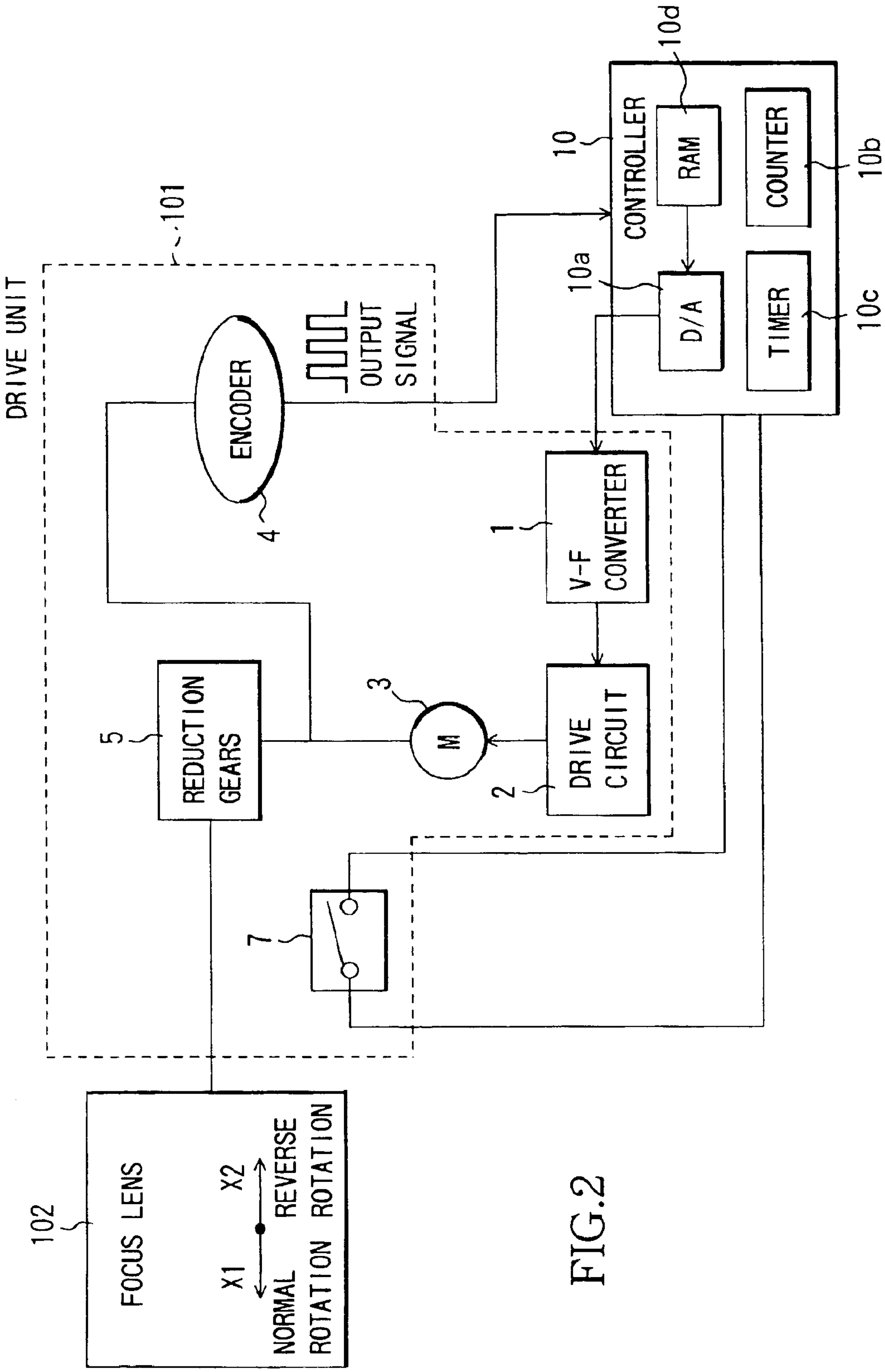
FIG. 2 is a block diagram showing the schematic structure of an interchangeable lens apparatus that constitutes the camera system.

FIG. 2 shows schematic structure inside the lens apparatus 105. The diagram shows a controller (frequency setting unit) 10 controlling the operation of a lens drive system, a V-F converter 1 setting a frequency of frequency signals (pulse signals with two different phases in this embodiment: hereafter, these are called drive signals) applied to an electro-mechanical energy converting element of a vibration type motor 3 to control the rotating speed (driving speed) of the vibration type motor 3, a drive circuit 2 that generates drive signals, having the frequency set by the V-F converter 1, and drives the vibration type motor 3, an encoder unit (position sensor) 4 to detect the driving of the vibration type motor 3, reduction gears 5 that decelerate an output of the vibration type motor 3 and transmit it to a focus lens 102, and an A/M switch 7 for selecting auto focus or manual focus so as to perform focusing.

Here, when the vibration type motor 3 is normally rotated, the focus lens 102 moves in the direction shown by an arrow X1 (direction of the optical axis) in FIG. 2. When the vibration type motor 3 is reversely rotated, the focus lens 102 moves in the direction shown by an arrow X2 (direction of the optical axis).

FIGS. 3(A), 3(B), and 3(C) show the relation among the frequency of drive signals applied to the vibration type motor 3, the drive speed of the vibration type motor 3, and the output of an encoder in a focus lens drive mechanism using the vibration type motor 3 in this embodiment.

Figure 3:
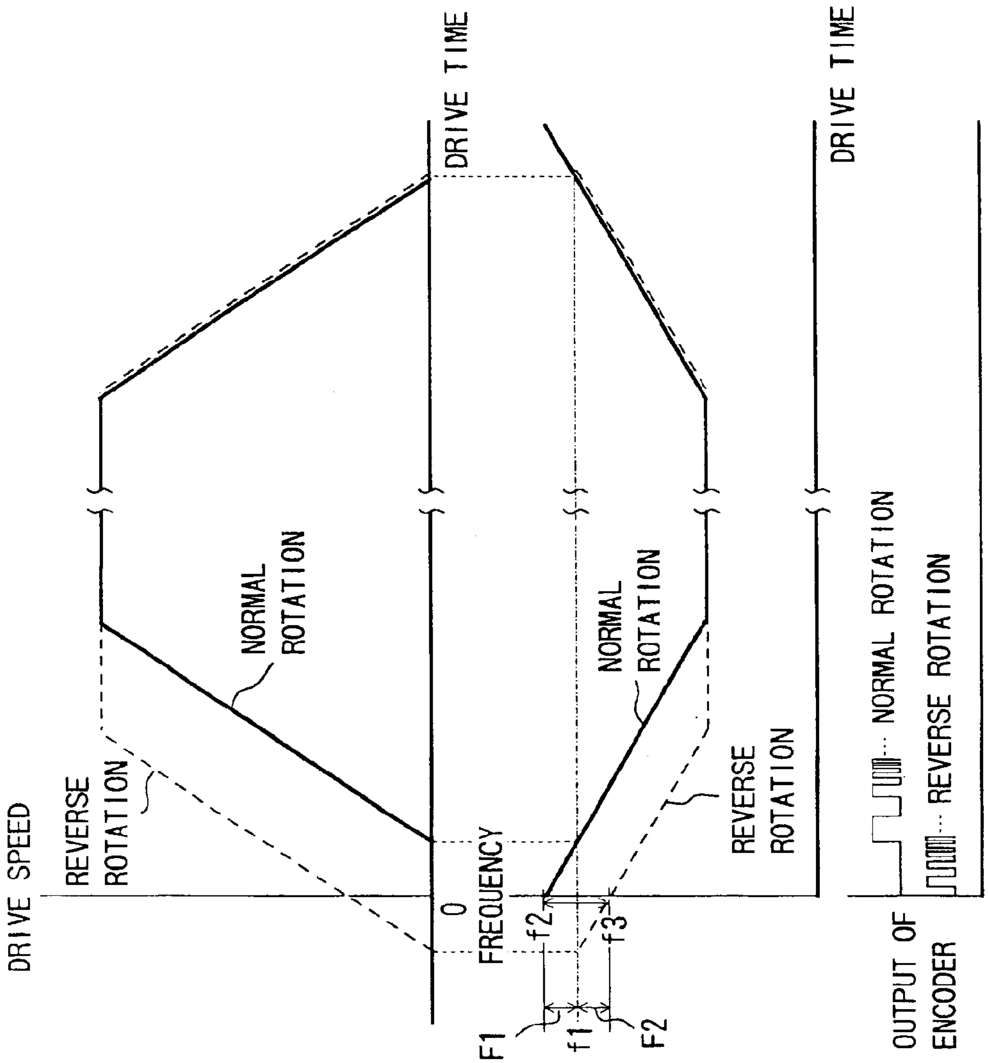
FIGS. 3(A), 3(B), and 3(C) are graphs showing the change of the frequency of drive signals applied to a vibration type motor in the lens apparatus, the change of the drive speed of the vibration type motor, and the output of an encoder.

FIG. 3(A) in an upper part of FIG. 3 shows the change of the drive speed of the vibration type motor 3 to the drive time, and FIG. 3(B) in a central part of FIG. 3 shows the change of the frequency of the drive signals, applied to the vibration type motor 3, to the drive time. In addition, FIG. 3(C) in an under part of FIG. 3 shows the output of the encoder unit 4.

Figure 6:
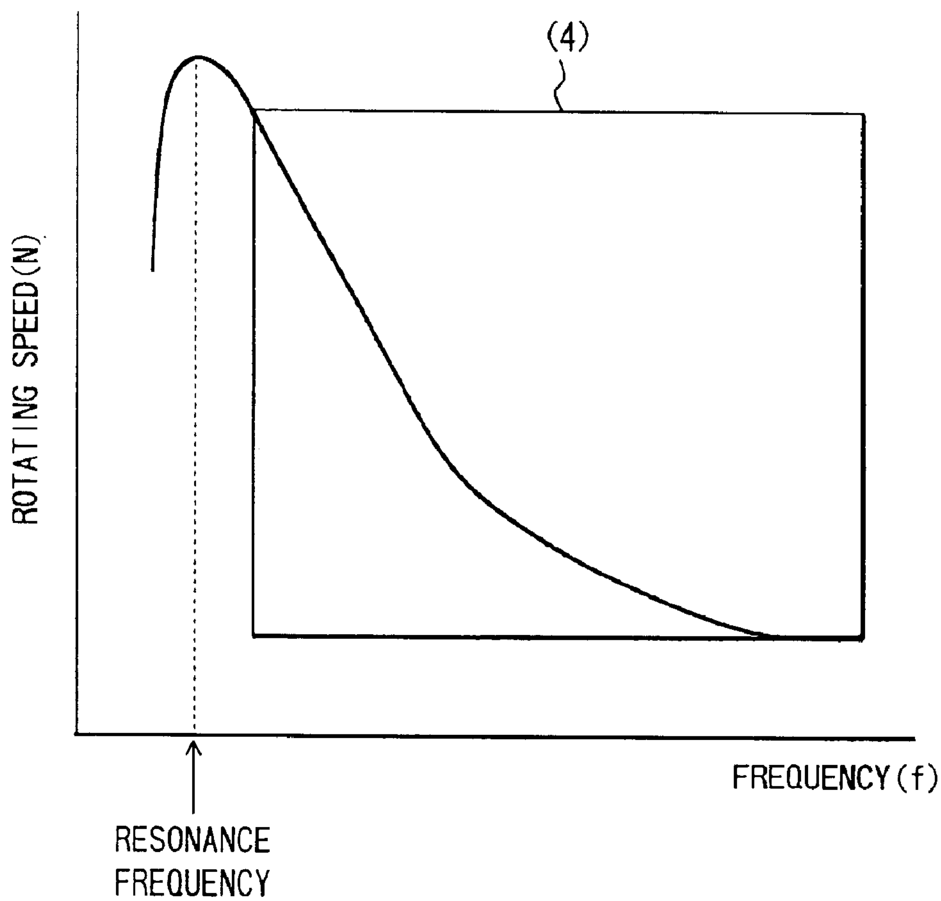
FIG. 6 is a graph showing the relation between the frequency of drive signals and the rotating speed of the vibration type motor.
Figure 7:
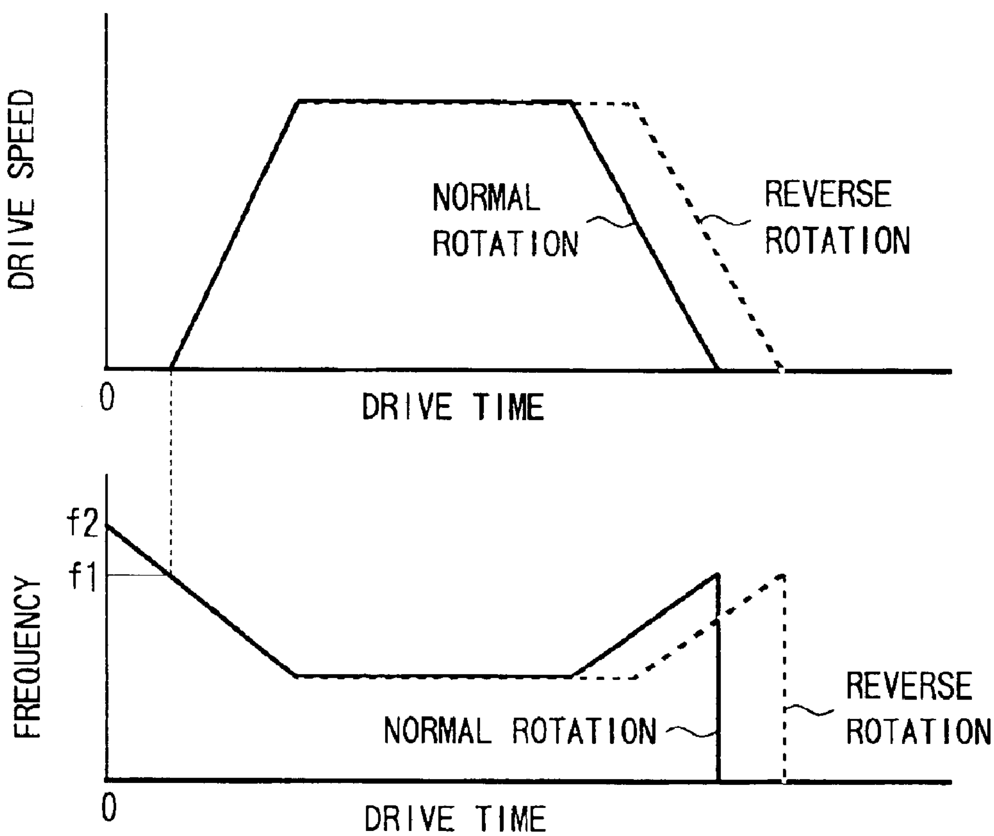
FIG. 7 includes graphs showing the change of the frequency of drive signals applied to a vibration type motor in a conventional interchangeable lens and showing the change the drive speed of the vibration type motor.
Figure 8:
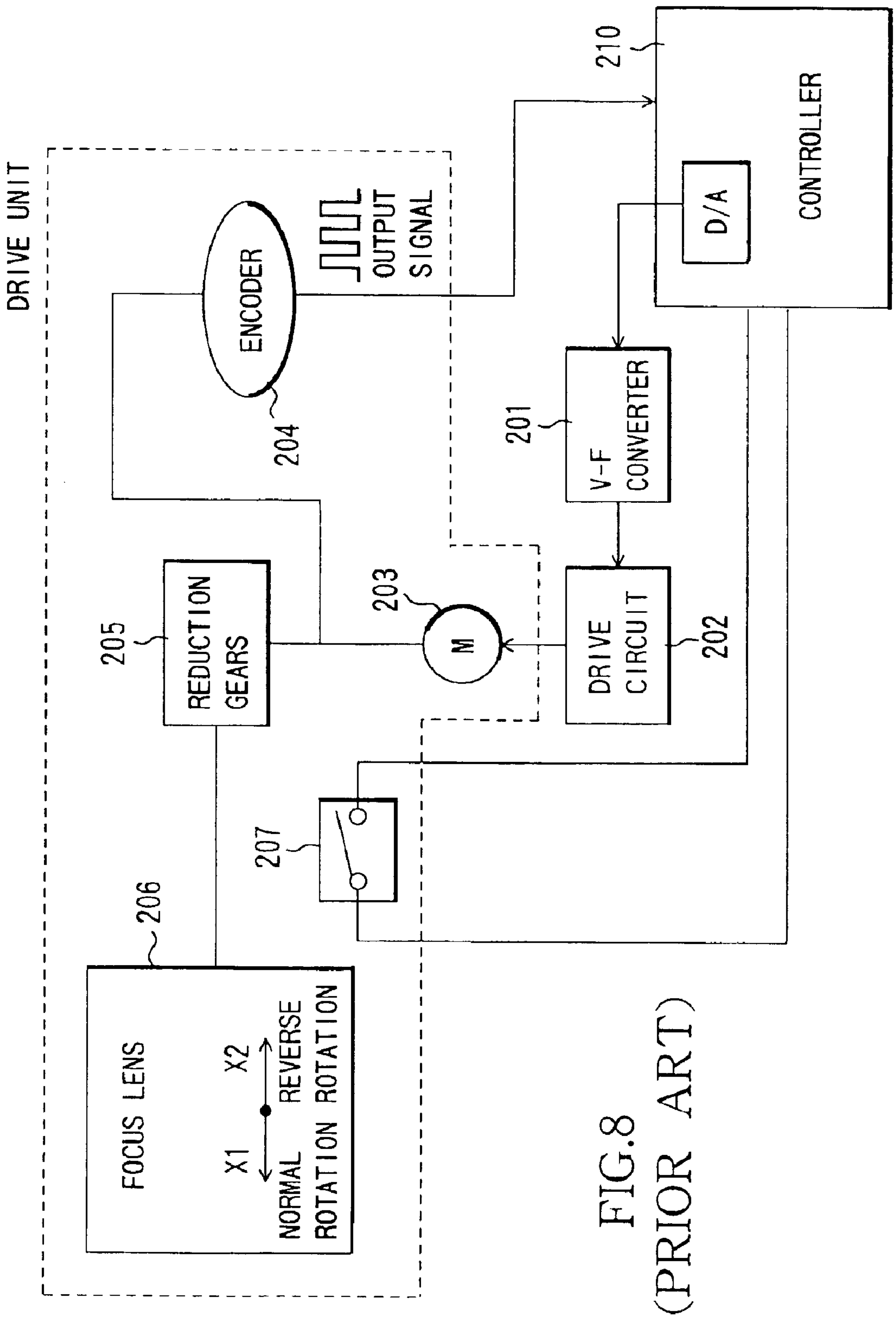
FIG. 8 is a block diagram showing the schematic structure of a conventional interchangeable lens.

Furthermore, as shown in FIG. 6, the vibration type motor 3 is driven by the drive signals in a frequency range (a frequency range enclosed by a frame shown by reference numeral (4)) that is higher than a resonance frequency where rotating speed becomes a peak. Then, in this area, the vibration type motor 3 has a characteristic that the lower the frequency of the drive signals is, the higher the rotating speed is.

In FIG. 3, f1 denotes a starting-off frequency showing a frequency at the time when the vibration type motor 3 started off when being driven at a first time after the lens apparatus 105 had been mounted in the camera 106, that is, a frequency at the time when an output of the encoder 4 was started.

In addition, f2 is a frequency of the drive signals, applied to the vibration type motor 3, at this (second) startup when the vibration type motor 3 is driven in the same direction as that in the last (first) driving (hereafter, this state is called "in normal rotation") (hereafter, this frequency is called a starting frequency in the normal rotation). Furthermore, f2 is set at a frequency that is higher by a first predetermined frequency (a range shown by an arrow F1 in FIG. 3) than the starting-off frequency f1 at the first driving.

Moreover, f3 is a frequency of the drive signals, applied to the vibration type motor 3, at this startup when the vibration type motor 3 is driven in the direction reverse to that in the last driving (hereafter, this state is called "in reverse rotation") (hereafter, this frequency is called a starting frequency in reverse rotation). In addition, f3 is set at a frequency that is lower by a second predetermined frequency (a range shown by an arrow F2 in FIG. 3) than the starting-off frequency f1 in the first driving. In the reverse rotation, the vibration type motor 3 starts off immediately after the application start of the drive signals by setting frequencies f1 to f3 as shown in the following expression (1).

Starting frequency f3 in reverse rotation<starting-off frequency f1<Starting frequency f2 in normal rotation . . . (1)

On the other hand, in the normal rotation (shown by a solid line in FIG. 3), the vibration type motor 3 starts off when a frequency is swept from f2 and reaches the starting-off frequency f1 after the application start of the drive signals. At this time, the encoder unit 4 starts an output as shown in FIG. 3(C). There is a reason why the starting frequency f2 in the normal rotation is set at a frequency that is higher to some degree than the starting-off frequency f1 in this manner. It is because there is a possibility of an overrun if the vibration type motor 3 is started at high speed from the beginning with setting a starting frequency at the starting-off frequency f1 or less since it is necessary in the normal rotation to stop driving, for example, at one pulse as it is in one pulse driving.

On the other hand, in the reverse rotation (shown by a dotted line in FIG. 3), an amount equivalent to backlash is added to a motor drive amount as described above. Hence, for example, even if it is the one pulse drive, 21 pulses of motor driving are needed in total since the amount equivalent to the backlash (for example, 20 pulses) is added to it. Hence, even if a starting frequency is lowered for the vibration type motor 3 to be started at high speed from the beginning, there happens no overrun since the publicly known speed control operates while the driving equivalent to the backlash is performed.

In this manner, it is possible to make time from the startup of the vibration type motor 3 to the actual starting-off of the focus lens 102 in reverse rotation be shorter than the startup time (time from the startup of the vibration type motor 3 to the actual starting-off of the focus lens 102) in the normal rotation. Hence, it is possible to shorten the drive time, which is necessary for driving the focus lens 102 to a target position (target pulse count), equally to that in the normal rotation even if there is backlash in the reduction gears 5 (refer to FIG. 3).

Figure 4:
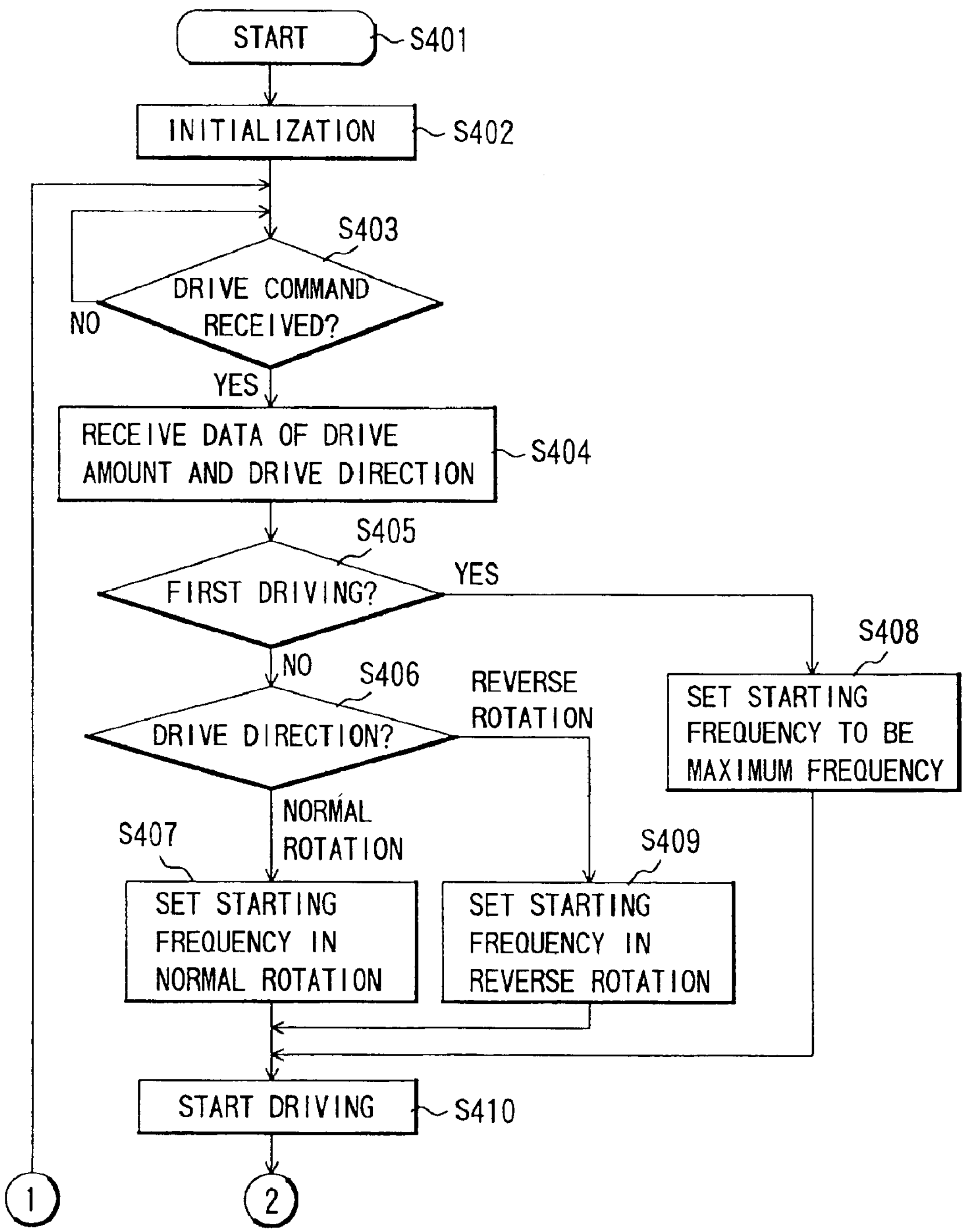
FIGS. 4(A) and 4(B) are a flow chart showing the control of the vibration type motor.
Figure 4:
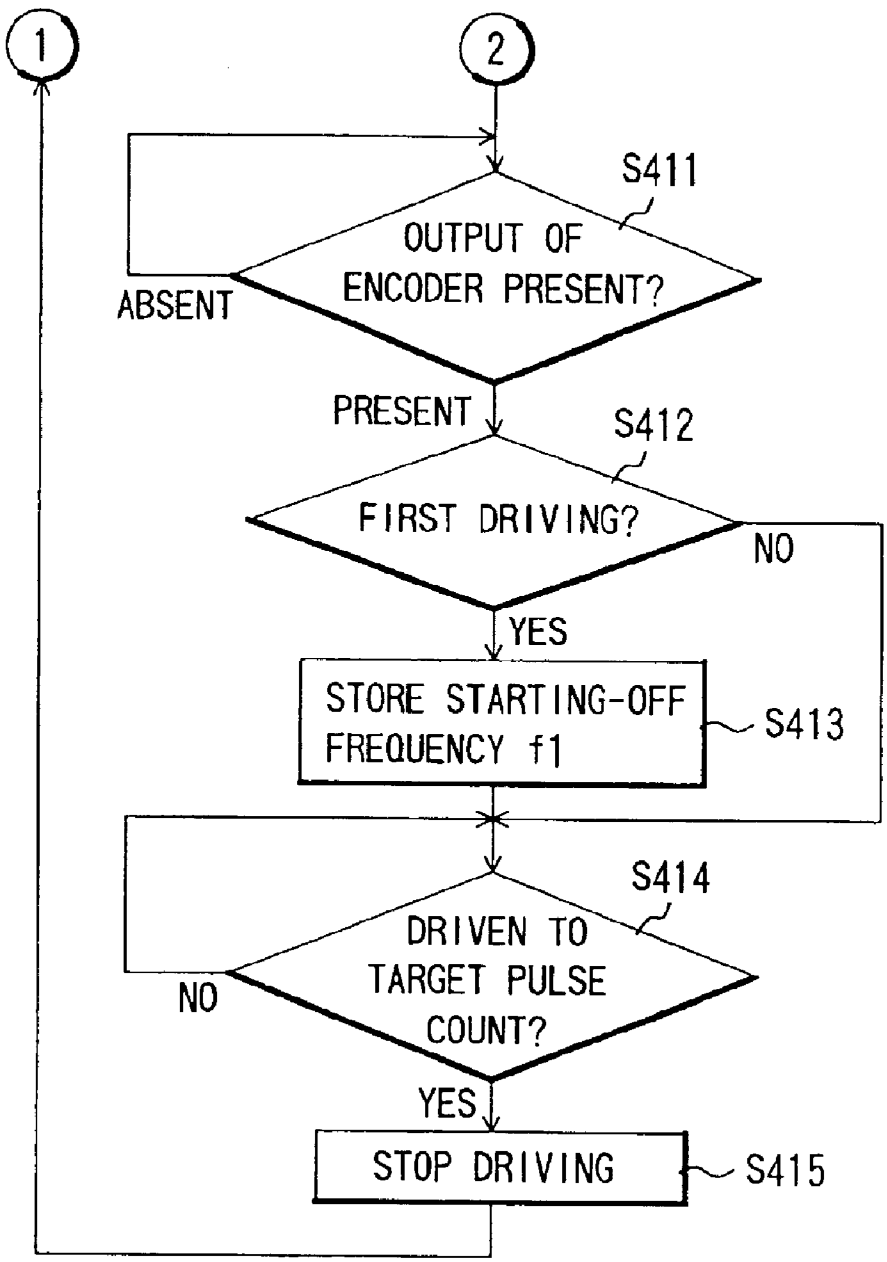

FIGS. 4(A) and 4(B) are a flow chart showing a control program of the vibration type motor 3 that the controller 10 mainly executes in this embodiment.

First, at step S401, this flow starts by the lens apparatus 105 being mounted in the camera 106.

At step S402, the controller 10 performs initialization such as setting of each port, read of memory contents in EEPROM not shown, and initialization of RAM.

Next, at step S403, the controller 10 communicates with the controller 110 provided in the camera 106 to determine whether the controller 10 has received a focus drive command from the controller 110 in the camera side. The process continues to recycle itself if the controller 10 has not received it, and if having received it, the process proceeds to step S404.

At step S404, the controller 10 further receives data showing a drive amount (target position) and the drive direction of the focus lens 102 from the controller 110 in the camera side (determination unit) to transfer the received data to RAM in the controllers 10.

In addition, in the reverse rotation whose drive direction is reverse to that in the last driving, the controller 10 transfers data, obtained by adding the pulse count, equivalent to the backlash of the reduction gears 5, to the data (pulse count) of the drive amount received from the camera 106, to RAM. This backlash amount is stored in ROM, not shown, in the controller 10 as a design value beforehand, or is measured and stored in EEPROM, not shown, at the time of factory shipment.

At step S405, the controller 10 determines whether this driving of the vibration type motor 3 is the first driving. If this driving is the first driving, the process proceeds to step S408, or if being the second or later driving, the process proceeds to step S406.

At step S406, the controller 10 determines which of normal rotation and reverse rotation the drive direction received at step S404 is. Then, if being the normal rotation, the process proceeds to step S407, or if being the reverse rotation, the process proceeds to step S409.

Here, a specific setting method of a frequency of drive signals will be described. RAM (memory unit) 10*d* (FIG. 2) for frequency control provided in the controller 10 stores 8 bits of data, and a frequency can be set in 256 steps from 00hex to FFhex. The number 00hex is a highest frequency (low-speed side), and FFhex is a lowest frequency (high-speed side). The acceleration and deceleration of the vibration type motor 3 is performed by changing the value of RAM 10*d* for frequency control.

Then, the setting of a starting frequency is performed as follows. First, at step S407, the controller 10 sets a starting frequency in normal rotation. Specifically, the controller 10 subtracts 10hex (a first predetermined frequency) from the starting-off frequency (8-bit data) stored at step S413 described below to set the difference in RAM 10*d* for frequency control.

In addition, at step S409, the controller 10 sets a starting frequency in reverse rotation. Specifically, the controller 10 adds 08hex (a second predetermined frequency) to the starting-off frequency (8-bit data) stored at step S413 described below to set the sum in RAM 10*d* for frequency control.

Furthermore, at step S408, since this is the first driving and the starting-off frequency f1 (8-bit data) is not stored at step S413 described below, the controller 10 sets the starting frequency at the highest frequency to be determined beforehand to set the frequency in RAM 10*d* for frequency control.

Next, at step S410, the controller 10 starts the driving of the vibration type motor 3. Specifically, the controller 10 sends data, set in RAM 10*d* for frequency control at steps S407 to S409, to the D/A converter 10*a* to generate an analog signal. The analog signal sent from the D/A converter 10*a* to the V-F converter 1 is converted into a frequency by the V-F converter 1, and a signal designating the frequency is sent to the drive circuit 2. The drive circuit 2 generates two phases of drive signals, which have the frequency and whose phases are mutually different, according to the signal from the V-F converter 1 to input the two phases of drive signals to an electro-mechanical energy converting element of the vibration type motor 3.

Here, in the case of the normal rotation, the frequency of the drive signals is lowered at a predetermined decreasing rate from f2. Then, the vibration type motor 3 starts off when the frequency reaches f1. Then, as the frequency of the drive signals is lowered, the vibration type motor 3 is accelerated.

On the other hand, in the case of the reverse rotation, the vibration type motor 3 starts off immediately when the drive signals are applied. As the frequency of the drive signals is lowered at a predetermined decreasing rate from f3, the vibration type motor 3 is accelerated.

It is possible to obtain an output with an increasing torque since a rotation output of the vibration type motor 3 is inputted into the reduction gears 5. Then, the focus lens 102 is driven by an output of the reduction gears 5. The encoder 4 installed in the vibration type motor 3 outputs a pulse signal since an output of the Vibration type motor 3 is generated. This pulse signal is inputted into the controller 10.

At step S411, the controller 10 determines whether a first pulse is inputted from the encoder 4. If the first pulse is not inputted, the process continues to recycle itself until it's becomes input at which time the process proceeds to step S412.

At step S412, the controller 10 determines whether this driving of the vibration type motor 3 is the first driving. If this driving is the first driving, the process proceeds to step S413, or if being the second or later driving, the process proceeds to step S414.

At step S413, the controller 10 stores data of RAM 10*d* for frequency control as a starting-off frequency f1 at the time of the first pulse being inputted from the encoder 4.

In addition, the controller 10 fetches pulses, inputted from the encoder 4, in the internal counter 10*b* to count the pulses.

At the same time, the controller 10 makes the timer 10*c*, provided in the controller 10 internally, operate to determine according to predetermined algorithm whether a pulse interval coincides with a predetermined target pulse interval (i.e., whether the drive speed of the vibration type motor 3 is along a predetermined target speed pattern). If the pulse interval does not coincide, the controller 10 sends data to the D/A converter 10*a* to change the frequency so that the pulse interval inputted from the encoder 4 may become the above-described target pulse interval.

At step S414, the controller 10 always monitors the data (pulse count) of the counter 10*b* to determine whether the pulse count reaches a number equivalent to the pulse drive amount designating a target position sent from the camera 106. Then, the controller 10 performs suitable deceleration according to a residual drive amount until the pulse count reaches the number equivalent to the pulse drive amount sent from the camera 106. When reaching the pulse drive amount, the controller 10 immediately sends data to the D/A converter 10*a* to stop the drive of the vibration type motor 3 at step S415.

As described above, according to this embodiment, when the drive direction of the vibration type motor 3 at startup is reverse to that in the last driving, the controller 10 lowers the starting frequency (lower than the starting-off frequency) than that in the normal rotation to quickly start the vibration type motor 3. Hence, it is possible to shorten the time, required for making the focus lens 102 driven to the target position, equally to that in the normal rotation even if there is backlash in the reduction gears 5.

In addition, in this embodiment, though the starting-off frequency f1 is made to be a frequency at the time when the vibration type motor 3 starts off in the first drive after the lens apparatus 105 has been mounted in the camera 106, the present invention is not limited to this. For example, it is also good to store a starting-off frequency in the normal rotation as f1 and to update the starting-off frequency f1 every time normal driving is performed.

In addition, in this embodiment, though the starting frequency f3 in the reverse rotation is set as a frequency that is lower than the starting-off frequency f1, the present invention is not limited to this. For example, so long as the relation satisfies the following expression (2), it is also good to set the starting frequency f3 in the reverse rotation to be a frequency that is higher than the starting-off frequency f1.

Starting frequency f3 in reverse rotation<Starting frequency f2 in normal rotation . . . (2)

Embodiment 2

Figure 5:
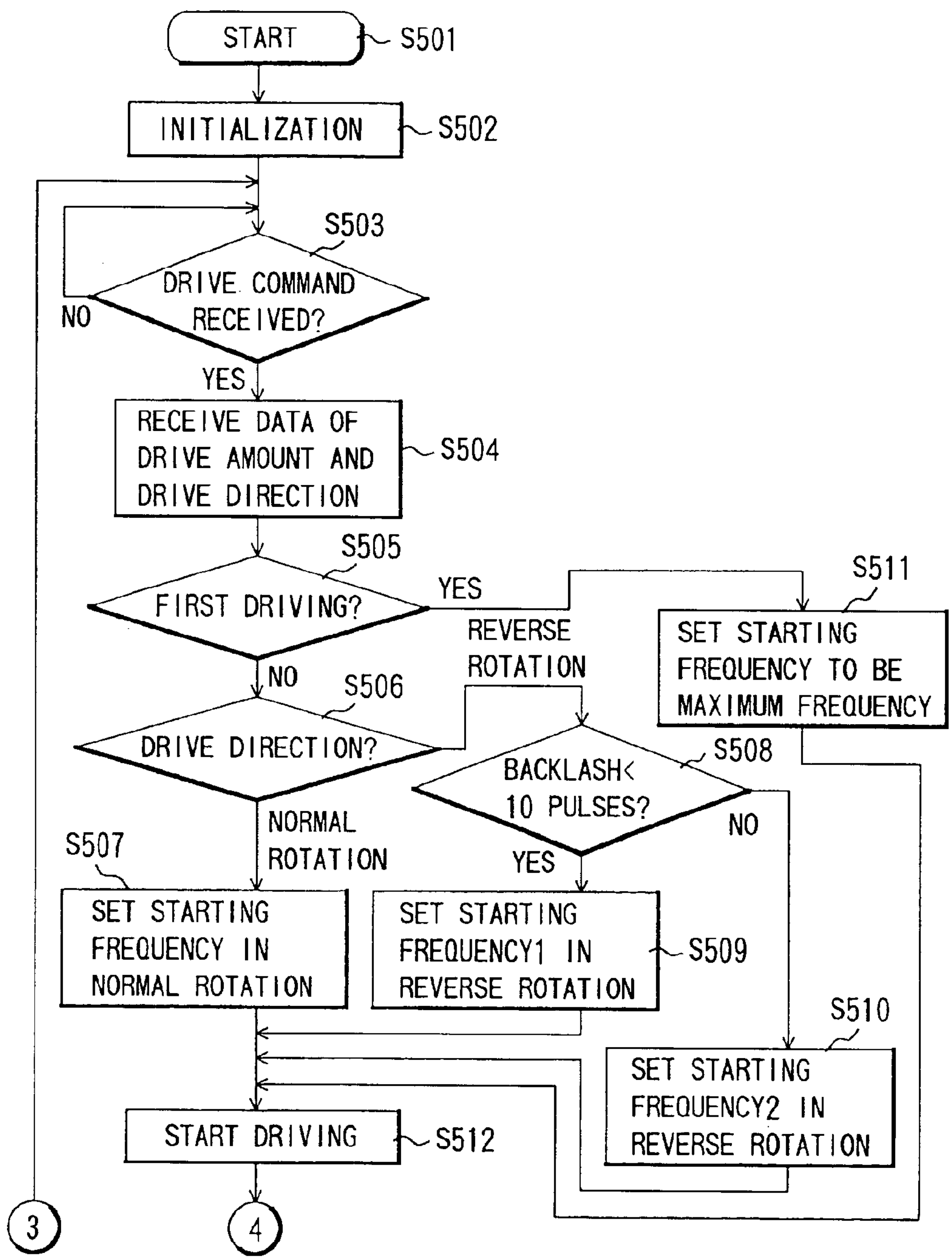
FIGS. 5(A) and 5(B) are a flow chart showing the control of a vibration type motor in the lens apparatus that is Embodiment 2 of the present invention.
Figure 5:
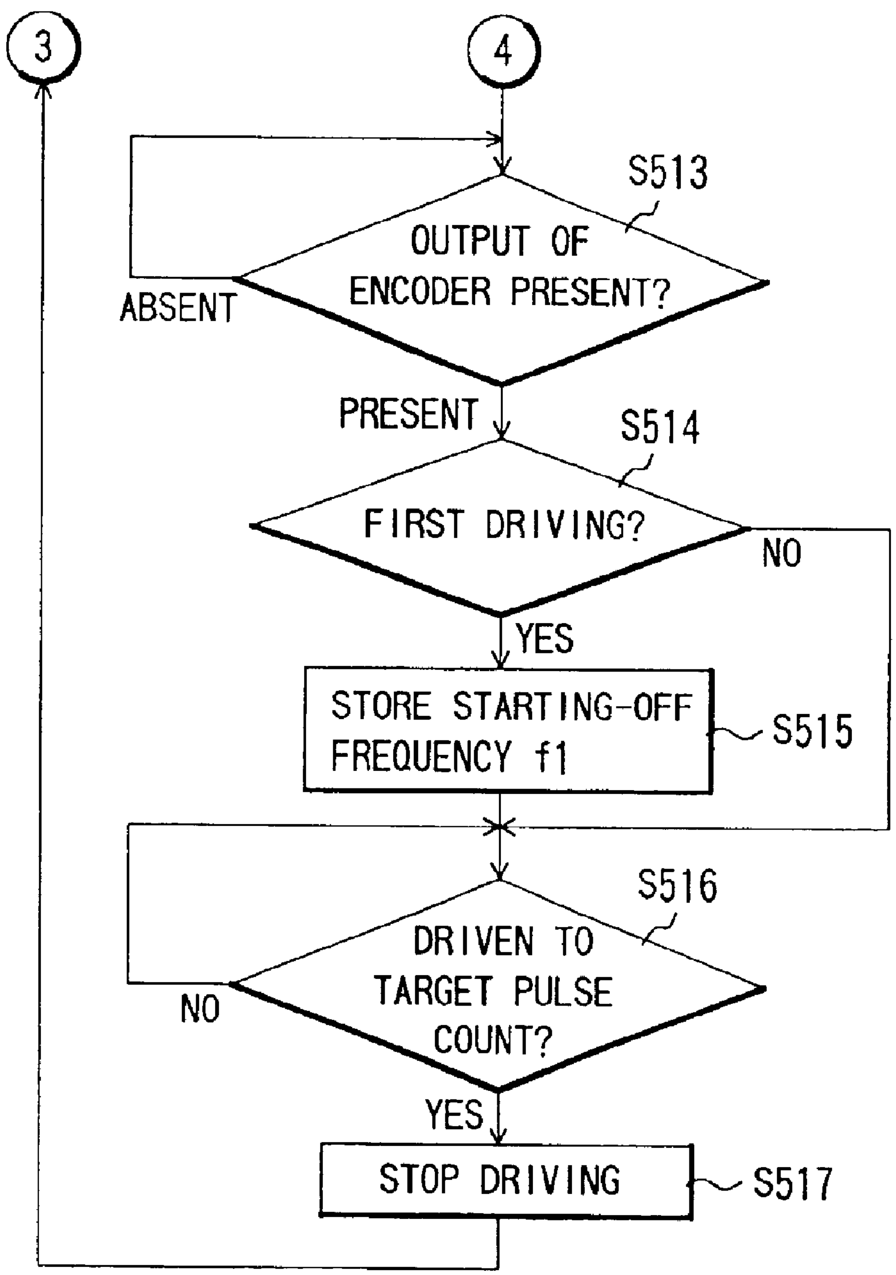

FIGS. 5(A) and 5(B) are a flow chart showing a control program of a vibration type motor in a lens apparatus that is Embodiment 2 of the present invention. In addition, the structure of the lens apparatus and the camera in this embodiment is the same as that of the lens apparatus and the camera in Embodiment 1. Hence, the same reference numerals are assigned in the description of this embodiment to components common to those in Embodiment 1.

First, at step S501, this flow starts by the lens apparatus 105 being mounted in the camera 106.

At step S502, the controller 10 performs initialization such as setting of each port, read of memory contents in EEPROM not shown, and initialization of RAM.

Next, at step S503, the controller 10 communicates with the controller 110 provided in the camera 106 to determine whether the controller 10 has received a focus drive command from the controller 110 in the camera side. If the controller 10 has not received it, the process continues to recycle itself, and if having received it, the process proceeds to step S504.

At step S504, the controller 10 further receives data showing a drive amount (target position) and the drive direction of the focus lens 102 from the controller 110 in the camera side (determination unit) to transfer the received data to RAM in the controller 10.

In addition, in the reverse rotation whose drive direction is reverse to that in the last driving, the controller 10 transfers data, obtained by adding the pulse count, equivalent to the backlash of the reduction gears 5, to the pulse drive amount received from the camera 106, to RAM. This backlash amount is stored in ROM, not shown, in the controller 10 as a design value beforehand, or is measured and stored in EEPROM, not shown, at the time of factory shipment.

At step S505, the controller 10 determines whether this driving of the vibration type motor 3 is the first driving. If this driving is the first driving, the process proceeds to step S511, or if being the second or later driving, the process proceeds to step S506.

At step S506, the controller 10 determines which of normal rotation and reverse rotation the drive direction received at step S504 is. Then, if being the normal rotation, the process proceeds to step S507, or if being the reverse rotation, the process proceeds to step S508. A specific setting method of a frequency of drive signals is the same as that in Embodiment 1.

At step S507, the controller 10 sets a starting frequency in the normal rotation. Specifically, the controller 10 subtracts 10hex (a first predetermined frequency) from the starting-off frequency (8-bit data) stored at steps S515 described below to set the difference in RAM 10*d* for frequency control.

At step S508, the controller 10 determines a backlash amount in the reduction gears 5. This backlash amount is stored in ROM, not shown, in the controller 10 as a design value, or is measured and stored in EEPROM, not shown, at the time of factory shipment. If the backlash amount is less than 10 pulses in terms of the output of the encoder 4, the process proceeds to step S509, and if being 10 pulses or more, the process proceeds to step S510.

At step S509, the controller 10 sets a starting frequency (starting frequency 1 in the reverse rotation) in the case that rotation is the reverse rotation and the backlash amount is less than 10 pulses. Specifically, the controller 10 adds 04hex (a second predetermined frequency) to the starting-off frequency (8-bit data) stored at step S515 described below to set the sum in RAM 10*d* for frequency control.

At step S510, the controller 10 sets a starting frequency (starting frequency 2 in the reverse rotation) in the case that rotation is the reverse rotation and the backlash amount is 10 pulses or more. Specifically, the controller 10 adds 08hex (a second-derivative predetermined frequency) to the starting-off frequency (8-bit data) stored at steps S515 described below to set the sum in RAM 10*d* for frequency control.

At these steps S509 and S510, in the reverse rotation, as the backlash amount is larger, the starting frequency is made to become lower. On the contrary, if the backlash amount is small, the starting frequency is made not to become so low. This is because it is necessary to fast drive the vibration type motor 3 from the beginning for shortening drive time since the drive amount of the vibration type motor 3 becomes large if the backlash amount is large. In addition, on the contrary, there is a possibility of an overrun (the focus lens 102 exceeds a target position) when the focus lens 102 is fast driven from the beginning in the case that the backlash amount is small, and in particular, when the focus lens 102 is driven by a small amount (small driving).

Furthermore, in this Embodiment, the starting frequency is changed on the border of ten pulses as the threshold value, moreover a situation where the threshold value is increased and the frequency is changed based on the threshold value is also acceptable.

At step S511, since this is the first driving and the starting-off frequency f1 (8-bit data) is not stored yet at step S515 described below, the controller 10 sets the starting frequency at the highest frequency to be determined beforehand to set the frequency in RAM 10*d* for frequency control.

Next, at step S512, the controller 10 starts the driving of the vibration type motor 3. Specifically, the controller 10 sends data, set in RAM 10*d* for frequency control at steps S507, and S509 to S511, to the D/A converter 10*a* to generate an analog signal. The analog signal sent from the D/A converter 10*a* to the V-F converter 1 is converted into a frequency by the V-F converter 1, and a signal designating the frequency is sent to the drive circuit 2. The drive circuit 2 generates two or four phases of drive signals, which have the frequency and whose phases are mutually different, according to the signal from the V-F converter 1 to input the drive signals to an electro-mechanical energy converting element of the vibration type motor 3. Owing to this, the vibration type motor 3 starts.

The encoder 4 installed in the vibration type motor 3 outputs a pulse signal since an output of the vibration type motor 3 is generated. This pulse signal is inputted into the controller 10.

It is possible to obtain an output with an increasing torque since a rotation output of the vibration type motor 3 is inputted into the reduction gears 5. Then, the focus lens 102 is driven by an output of the reduction gears 5.

At step S513, the controller 10 determines whether a first pulse is inputted from the encoder 4. If the first pulse is not inputted, the process continues to recycle it serf until it's becomes input at which time the process proceeds to step S514.

At step S514, the controller 10 determines whether this driving of the vibration type motor 3 is the first driving. If this driving is the first driving, the process proceeds to step S515, or if being the second or later driving, the process proceeds to step S516.

At step S515, the controller 10 stores data of RAM 10*d* for frequency control as a starting-off frequency f1 at the time of the first pulse being inputted from the encoder 4.

In addition, the controller 10 fetches pulses, inputted from the encoder 4, in the internal counter 10*b* to count the pulses.

Furthermore, at the same time, the controller 10 makes the timer 10*c*, provided in the controller 10 internally, operate to determine according to predetermined algorithm whether a pulse interval coincides with a predetermined target pulse interval (i.e., whether the speed of the vibration type motor 3 is along a predetermined target speed pattern). If the pulse interval does not coincide, the controller 10 sends data to the D/A converter 10*a* to change the frequency so that the pulse interval inputted from the encoder 4 may become the above-described target pulse interval.

At step S516, the controller 10 always monitors the data (pulse count) of the counter 10*b* to determine whether the pulse count reaches a number equivalent to the pulse drive amount designating a target position sent from the camera 106. Then, the controller 10 performs suitable deceleration according to a residual drive amount until the pulse count reaches the number equivalent to the pulse drive amount sent from the camera 106. When reaching the pulse drive amount, the controller 10 immediately sends data to the D/A converter 10*a* to stop the drive of the vibration type motor 3 at step S517.

As described above, according to this embodiment, when the drive direction of the vibration type motor 3 at startup is reverse to the last drive direction, the controller 10 lowers the starting frequency (lower than the starting-off frequency) than that in the normal rotation to quickly start the vibration type motor 3. Hence, it is possible to shorten the drive time of the focus lens 102 to the target position, equally to that in the normal rotation even if there is backlash in the reduction gears 5.

Moreover, since the starting frequency in the reverse rotation is made to be changed according to the backlash amount in this embodiment, it is possible to suppress the occurrence of an overrun in small driving.

In addition, the present invention can be applied also to other optical equipment such as a camera integrated with a lens barrel and an observation instrument though a lens apparatus interchangeable for a camera is described in the above-described Embodiments 1 and 2. Here, when an application is a camera integrated with a lens barrel, it is possible to perform the drive control of a vibration type motor by a controller (corresponding to reference numeral 110 in FIG. 2) provided in the camera. In addition, the present invention can be applied not only to optical equipment, but also to various apparatuses each using a vibration type actuator as a driving force.

While preferred embodiments have been described, it is to be understood that modification and variation of the present invention may be made without departing from the scope of the following claims.

What is claimed is:

1. A control apparatus for a vibration type actuator that excites vibration in a vibration body by applying a frequency signal to an electro-mechanical energy converting element and relatively moves the vibration body and a contact body contacting to the vibration body, comprising:

a determination unit determining a drive direction of the vibration type actuator; and a frequency setting unit modifying a frequency of the frequency signal according to whether the drive direction of the vibration type actuator determined by the determination unit is the same as or reverse to the last drive direction at the startup of the vibration type actuator.

2. The control apparatus for a vibration type actuator according to claim 1, wherein the frequency setting unit lowers a frequency of the frequency signal in the case where the drive direction of the vibration type actuator is reverse to that in the last driving than that in the case the drive direction of the vibration type actuator is the same as that in the last driving.

3. The control apparatus for a vibration type actuator according to claim 1, further comprising:

a sensor detecting drive of the vibration type actuator; and a memory unit storing a frequency of the frequency signal at the time when it is detected by the sensor that drive of the vibration type actuator is started, wherein the frequency setting unit sets the frequency of the frequency signal on the basis of the frequency stored in the memory unit.

4. The control apparatus for a vibration type actuator according to claim 3, wherein the frequency setting unit lowers the frequency of the frequency signal in the case where a drive direction of the vibration type actuator is reverse to that in the last driving than the frequency stored in the memory unit.

5. Electronic apparatus comprising:

a driven member that is movable;

a vibration type actuator that excites vibration in a vibration body by applying a frequency signal to an electro-mechanical energy converting element and relatively moves the vibration body and a contact body contacting to the vibration body;

a determination unit determining a drive direction of the vibration type actuator; and a frequency setting unit modifying a frequency of the frequency signal according to whether the drive direction of the vibration type actuator determined by the determination unit is the same as or reverse to the last driving direction at startup of the vibration type actuator.

6. The electronic apparatus according to claim 5, wherein the frequency setting unit lowers a frequency of the frequency signal in the case where a drive direction of the vibration type actuator is reverse to that in the last driving than that in the case the drive direction of the vibration type actuator is the same as that in the last driving.

7. The electronic apparatus according to claim 5, further comprising:

a sensor detecting movement of the driven member; and a memory unit storing a frequency of the frequency signal at the time when it is detected by the sensor that drive of the driven member is started, wherein the frequency setting unit sets a frequency of the frequency signal on the basis of the frequency stored in the memory unit.

8. The electronic apparatus according to claim 7, wherein the frequency setting unit lowers a frequency of the frequency signal in the case where a drive direction of the vibration type actuator is reverse to that in the last driving than the frequency stored in the memory unit.

* * * * *